United States Patent

[11] 3,540,740

| [72] | Inventor | Russell G. Smith |
| | | Cincinnati, Ohio |
| [21] | Appl. No. | 779,150 |
| [22] | Filed | Nov. 26, 1968 |
| [45] | Patented | Nov. 17, 1970 |
| [73] | Assignee | Xomox Corporation |
| | | Cincinnati, Ohio |
| | | a corporation of Ohio |

[54] SEALING MEANS FOR PLUG VALVE STEMS
15 Claims, 7 Drawing Figs.

[52] U.S. Cl.................................................. 277/26,
277/58, 277/117, 277/105; 251/214
[51] Int. Cl................................................... F16j 9/00,
F02f 5/00
[50] Field of Search.......................................... 277/26,
117, 58, 105; 251/214, 312

[56] References Cited
UNITED STATES PATENTS

| 3,192,942 | 7/1965 | Manor et al. ................. | 251/214X |
| 3,294,408 | 12/1966 | Smith ............................ | 277/58 |
| 3,371,676 | 3/1968 | Mullaney...................... | 251/214X |
| 3,406,707 | 10/1968 | Schenck....................... | 251/214X |

Primary Examiner—Samuel Rothberg
Attorney—J. Warren Kinney, Jr.

ABSTRACT: The sealing means surrounding the operating shank or stem of a plug valve, which may lose stability and gain an overburden of responsibility for leakage prevention resulting from destruction or volatilization of other internal seals, is provided with a system of diaphragms and sealing elements capable of augmenting the shank sealing function as the burden of leakage prevention increases. In effect, the diaphragm arrangement includes wedging areas for increasing the force of sealing contact of a sealing material against the shank, as other sealing means within the valve yield to destruction by heat or flame.

Patented Nov. 17, 1970  3,540,740

INVENTOR
RUSSELL G. SMITH
BY J. Warren Kinney Jr.
ATTORNEY

INVENTOR
RUSSELL G. SMITH

INVENTOR
RUSSELL G. SMITH

SEALING MEANS FOR PLUG VALVE STEMS

This invention relates to improvements in sealing means for a plug valve stem, to prevent leakage of fluid from the valve externally past the valve stem, under various conditions of use and environment.

Valves of the type herein disclosed are adapted for service under conditions which are sometimes very damaging to internal seals, as by reason of exposure to corrosive fluids internally or externally of the valve; to widely variable temperature changes in fluids controlled by the valve or in the atmosphere surrounding the valve; or by reason of direct exposure to fire or the intense heat of flame or explosion. Under such conditions, leakage from the valve may be expected to occur around the operating shank or stem of the valve, and if the leaking fluid is such as to be injurious to health, or such as to contribute to combustion or explosion, the leakage problem becomes one of primary importance.

The problem of leakage along the operating shank or stem is aggravated, under adverse conditions as mentioned above, when the valve is provided with a liner in which the plug thereof is rotatable, because the liner usually is vulnerable to destruction by intense heat. Upon destruction or volatilization of the liner, the plug and the shank thereof lose support or stability, and the line pressure of fluid normally under the control of the valve is imposed upon the shank seal, which must then assume all of the burden of leakage prevention.

The present invention is concerned with improving the construction of the shank sealing means, or stem sealing means, of a plug valve of a type which, under adverse conditions, may impose a heavy burden of leakage prevention upon the shank or stem sealing means of the valve.

An object of the invention is to provide improved yet simple means for preventing leakage of fluid past the operating shank or stem of a rotary plug valve.

Another object of the invention is to provide means for the purpose stated, which is economical to manufacture and assemble and which is applicable with great advantage to plug valves equipped with volatilizable liners.

Another object is to provide an improved sealing means of the character stated, the principle of operation of which is applicable to plug valves of various types, for precluding external leakage with great effectiveness and reliability.

The foregoing and other objects are attained by the means described herein and illustrated upon the accompanying drawings, in which.

Figure 1:
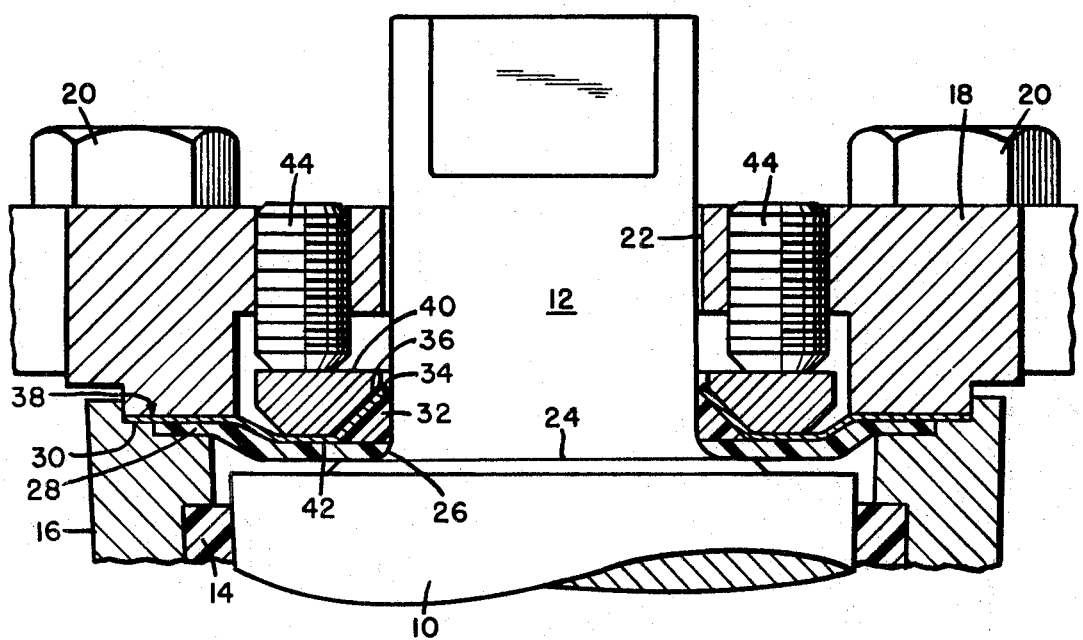
FIG. 1 is a fragmental vertical cross section of the stem area of a plug valve incorporating the improved sealing means of the invention.

In all of the drawing views, the reference numeral 10 indicates the rotary valving member or plug of a plug valve, and 12 indicates the operating shank or stem to be rotated for rotating the plug 10 within a sleeve or seat member 14 supported within the plug chamber of a valve body 16. A cover plate or bonnet 18 is secured to the valve body 16 in any suitable manner, as by means of cap screws 20, and has a bore 22 loosely accommodating the plug stem. The stem may be rotated by means of a lever, handwheel, or other turning implement applied to the flattened upper end of the stem.

It may be here noted that the plug may rotate against a sleeve, liner, or seat such as 14, or against a seat comprising the bare metal of the valve body chamber, this depending upon the service the valve is to perform. Also, the plug may be either tapered as shown, or cylindrical in form, as may be desired.

The upper end of the valve plug in FIG. 1 may carry an elevated annular shoulder 24 which meets the stem at a fillet 26. Upon shoulder 24 rests the inner marginal portion of a centrally apertured nonmetallic diaphragm 28, which bears also upon the fillet 26. Upon the diaphragm 28 rests a stiff or rigid backup diaphragm 30 of metal or other suitable material, which is centrally apertured to loosely surround the valve stem. The outer marginal portions or rims of both diaphragms are securely clamped together between the body and the cover plate, by the bolts 20.

The diaphragm 28 is formed preferably of a fluid and gas impervious plastic material such as Teflon or equivalent, and upon it about the stem is superposed a stem-embracing pressure seal ring 32, known in the art as a "Delta" ring, which likewise may be formed of a fluid and gas impervious plastic material. Ring 32 may be formed of Teflon or equivalent seal material, if desired, but may sometimes be formed of asbestos or equivalent fireproof material.

Seal ring 32 may be triangular in cross section as shown, with the legs of the triangular shape bearing against the stem 12 and upon the upper face of diaphragm 28 adjacent to fillet 26, the hypotenuse 34 thereof being disposed at acute angles to stem 12 and shoulder 24. The hypotenuse 34 hereafter may be referred to as an angularly inclined wedge face of pressure seal ring 32.

It is important to note that the metallic backup diaphragm 30 has its central aperture defined by an angularly upturned conical annulus or collar 36, the angularity of which corresponds closely with the inclination of the wedge face 34 of ring 32. The annulus 36 preferably covers a major portion of the area of wedge face 34, and may extend upwardly to an elevation above the clamp surface 38 of cover plate 18. The pressure seal ring 32 bears directly upon the non metallic diaphragm 28, in the FIG. 1 construction, and may be formed of Teflon or equivalent seal material. In some instances, the ring 32 may be formed of asbestos or similar fire-proof seal material, as will be explained hereinafter.

A floating thrust ring 40 surrounds the plug stem and bears upon the inclined diaphragm annulus 36 as well as upon the adjacent horizontal seat 42 thereof which surrounds the annulus. By means of several adjusting screws 44 threadedly mounted on cover plate 18, force may be applied to ring 40 for holding the parts 36, 32 and 28 in firm sealing contact upon plug shoulder 24 and stem 12. As is usual, three adjusting screws 44 equally spaced apart may be employed, in order to apply equalized pressure on the thrust ring without risk of bending the ring or causing disalignment of parts surrounding the stem. Ring 40 may be formed of metal or other durable rigid material.

In the light of the foregoing explanation, it should be apparent that any leakage of fluid upwardly along the plug and past the sleeve 14, will follow the lower face of diaphragm 28 and seek escape either at the outer rim of said diaphragm, where escape is practically impossible, or at the plug shoulder 24 and fillet 26.

In practice, it is found that the force of thrust ring 40 applied downwardly against the metallic diaphragm at 42 and obliquely against the annulus 36, produces very effective leakproof seals between the pressure seal ring 32, the diaphragms, and those parts of the valving member which abut such elements. The inclined annulus 36 imposes an oblique force against ring 32, to constantly effect a firm sealing thereof against shank 12, while at the same time maintaining a seal between shoulder 24 and diaphragm 28 adjacent to fillet 26.

From the foregoing, it will be understood that the construction above described produces three seals, namely, (1) the circumferential seal between the plug and the valve body at 14; (2) the seal atop shoulder 24 provided by the inner margin of non metallic diaphragm 28, including the fillet 26; and (3) the seal between the shank 12 and pressure seal ring 32.

Figure 2:
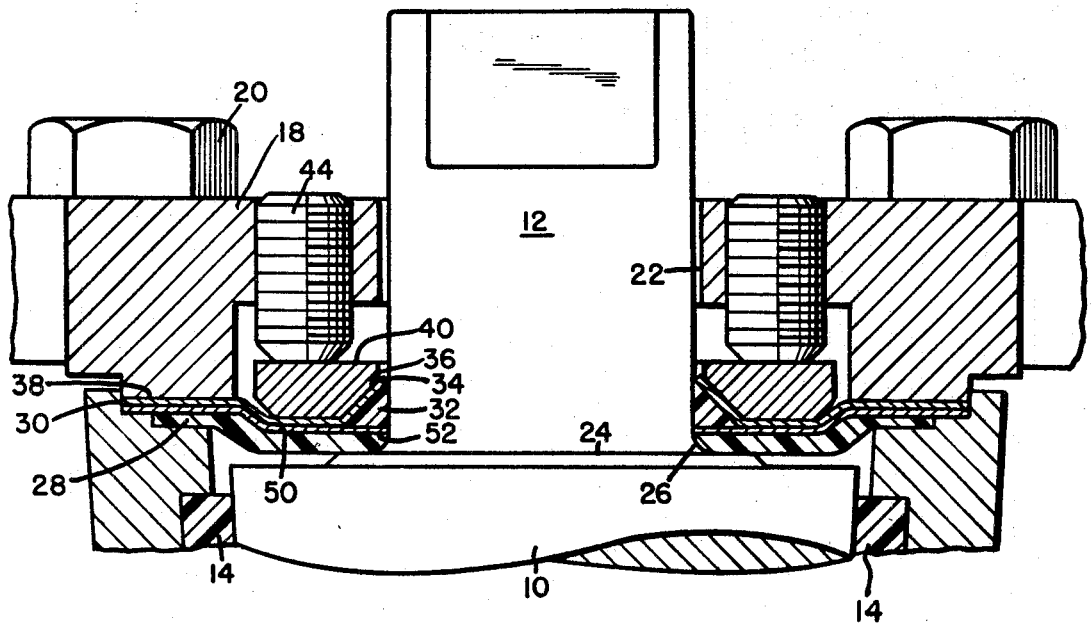
FIG. 2 is a view similar to FIG. 1, showing a modification.

The modification illustrated by FIG. 2 differs from FIG. 1 only in providing a secondary metallic diaphragm 50 underlying the metallic diaphragm 30 and overlying the nonmetallic diaphragm 28. The metallic secondary diaphragm has an inner flat marginal portion 52 which is interposed between pressure seal ring 32 and the inner margin of the nonmetallic diaphragm 28. Portion 52 extends substantially into contact with plug stem 12, and is clamped between the parts 32 and 28 by force imposed by thrust ring 40.

In FIG. 2, if any fluid leaks upwardly along plug 10 past the sleeve 14, it will seek to escape between plug shoulder 24 and the overlying portion of nonmetallic diaphragm 28. Rather than climb upwardly along stem 12, any fluid leaking past the fillet 26 will flow horizontally outwardly along one or both faces of metallic diaphragm 50. Such flow of fluid horizontally will be choked off at the clamp area 38, where clamping force is maximal at all times. Due to the upward inclination of annulus 36, and the considerable force with which it bears upon the pressure face 34 of ring 32, leakage along said face 34 is virtually impossible. The sealing force between ring 32 and stem 12 is normally adequate to preclude upward leakage of fluid along the stem.

Before proceeding with a description of other drawing views, it may be noted that the sealing means of FIGS. 1 and 2 can be rendered "fire safe" by substituting for the plastic pressure seal ring 32, a replacement pressure ring of the same shape formed of asbestos fiber or equivalent fireproof material possessing the quality of limited compressibility. The plastic or Teflon diaphragm 28 and sleeve 14 are retained without substitution because of their superior sealing performance under normal conditions.

Figure 3A:
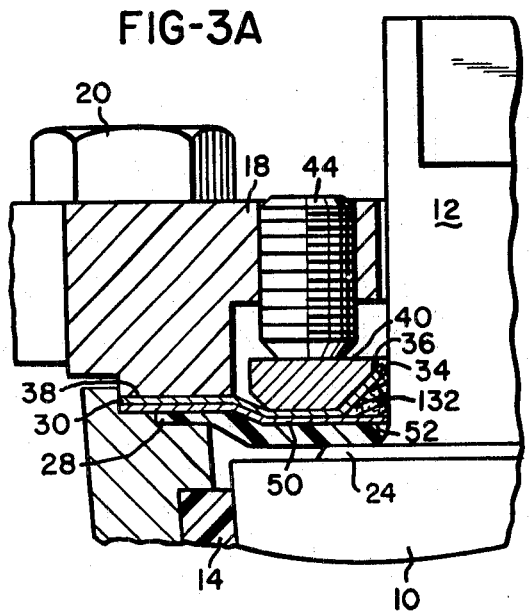
FIG. 3A is a fragmental vertical cross section of a valve like FIG. 2, with fire-safe shank seal means.

The pressure seal ring 32 of fireproof material will be substantially uneffected in its performance under high temperature conditions, but diaphragm 28 and sleeve 14 being of Teflon or similar plastic material, are subject to substantial deterioration, usually by volatilization. In this connection, reference may be made to FIG. 3A showing the sealing elements 14 and 28 of the valve intact prior to exposure to flame or excessive heat, whereas FIG. 3B shows these elements dissipated by heat to the extent of being practically nonexistent within the valve structure.

Figure 3B:
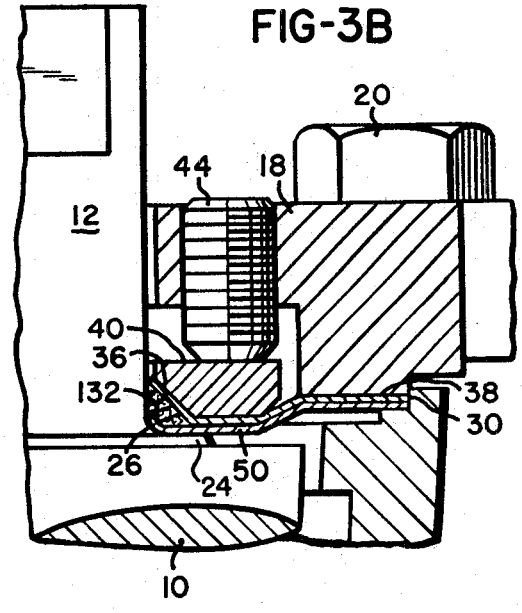
FIG. 3B shows the valve sealed against shank leakage after vaporization of certain sealing elements.

With the plastic sealing elements dissipated according to FIG. 3B, pressure of fluid within the valve 24 impinges forcefully against the underface of metallic diaphragm 50, to impose an upward compressive force upon the fireproof fibrous seal ring 132. This upward force is directed against the inclined annulus 36, which wedges the ring 132 upwardly and inwardly toward shank 12, to augment the sealing effect of ring 132 about the plug shank. Thus, coincidental with loss of the sealing elements 14 and 28, the sealing characteristics of the ring seal at 132 is substantially augmented and increased;

a. by reason of the resultant upward face which is directed against the inclined annulus 36, and
b. by reason of the pressure trapped between the two metal diaphragms 50 and 38 which forces ring seal 132 tightly against and in effective sealing engagement with plug shank 12. The clamping force at the outer periphery of diaphragms 30 and 50, remains unaffected by volatilization of the nonmetallic diaphragm 28.

From the foregoing explanation, it is apparent that a pressured system containing a dangerous fluid, and located in an environment in which a fire hazard exists, can be rendered quite safe against any escape of dangerous fluid by incorporating valves of the character herein disclosed. The pressure seal ring 32 or 132, if formed of fireproof fibrous material, automatically undergoes a firm increase of compression by plug shoulder 24 when seals 14 and 28 volatilize and permit axial displacement of the valve plug by the force of internal fluid pressure. The automatic fortification of the pressure seal ring with increased sealing power, as sealing elements 14 and 28 lose their effectiveness, constitutes an advantage of importance.

Figure 4:
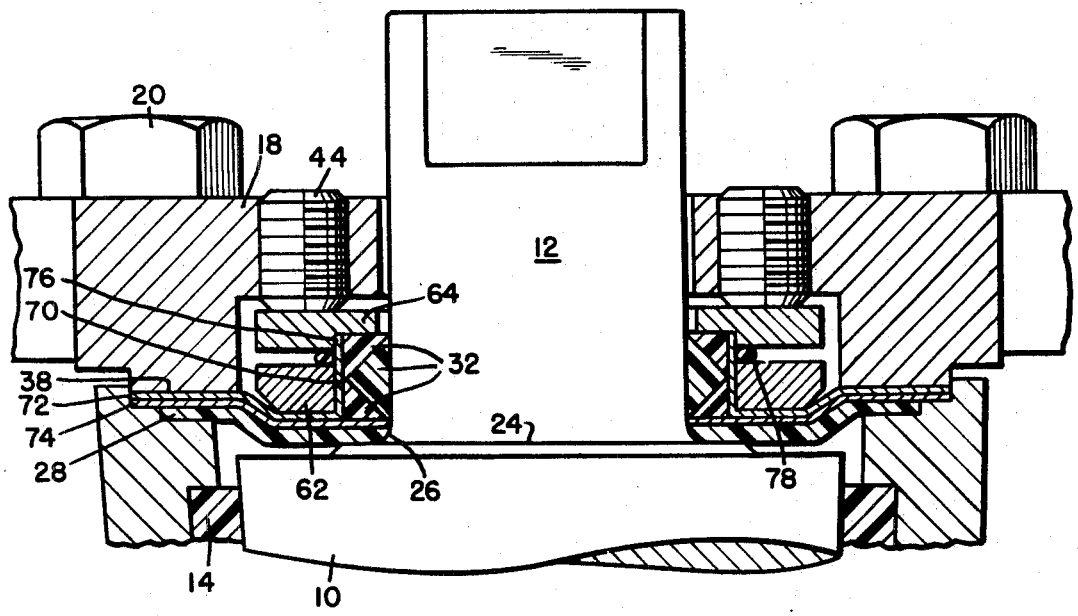
FIG. 4 is a view similar to FIG. 1, showing a second modification thereof.

In the FIG. 4 modification there is incorporated a cluster of stem-embracing pressure seal rings 32, three being shown by way of example, arranged to produce a composite sealing structure having an exterior vertical wall 70. In this case, the metallic diaphragm 72 which overlies a secondary metallic diaphragm 74, has its inner marginal portion upturned as a collar 76 to abut the wall 70 formed by the cluster of rings 32. Both of the metallic diaphragms overlie the non metallic diaphragm 28, which latter diaphragm seals against plug shoulder 24 and fillet 26, as usual.

The metallic diaphragm 74 reaches approximately to stem 12, and is interposed between the inner marginal portion of diaphragm 74 and the bottom ring 32 of the cluster of such rings surrounding the plug stem.

A lower metallic thrust ring 62 surrounds closely the collar 76 and rests upon the upper surface of diaphragm 72. An upper metallic thrust ring 64 overlies the cluster of rings 32 and is arranged to compress said ring cluster vertically upon advancement of the adjusting screws 44. The upper thrust ring 64 overlies in spaced relation the lower ring 62, but is adapted to apply force to said lower ring through the medium of a resilient spacer ring 78 interposed between the thrust rings.

In FIG. 4 fluid leaking upwardly along the plug and sleeve 14 will seek to escape along shoulder 24 and fillet 26. Such fluid may enter between the metallic diaphragms 72 and 74 but will be unable to pass the clamping pressure at 38 between the cover plate and the valve body. As the cluster of rings 32 is under heavy compression, leakage fluid will not flow upwardly along the stem sealed by the ring cluster, nor will it ascend the wall of collar 76 where the compression force is equally heavy. It should be noted that the triangular cross-sectional shape of the rings 32 constituting the cluster, induces a lateral displacement of the rings as vertical force is applied thereto by thrust ring 64, thereby tending to expand the ring cluster forcefully against stem 12 and upstanding collar 76, to there form effective seals.

Figure 5:
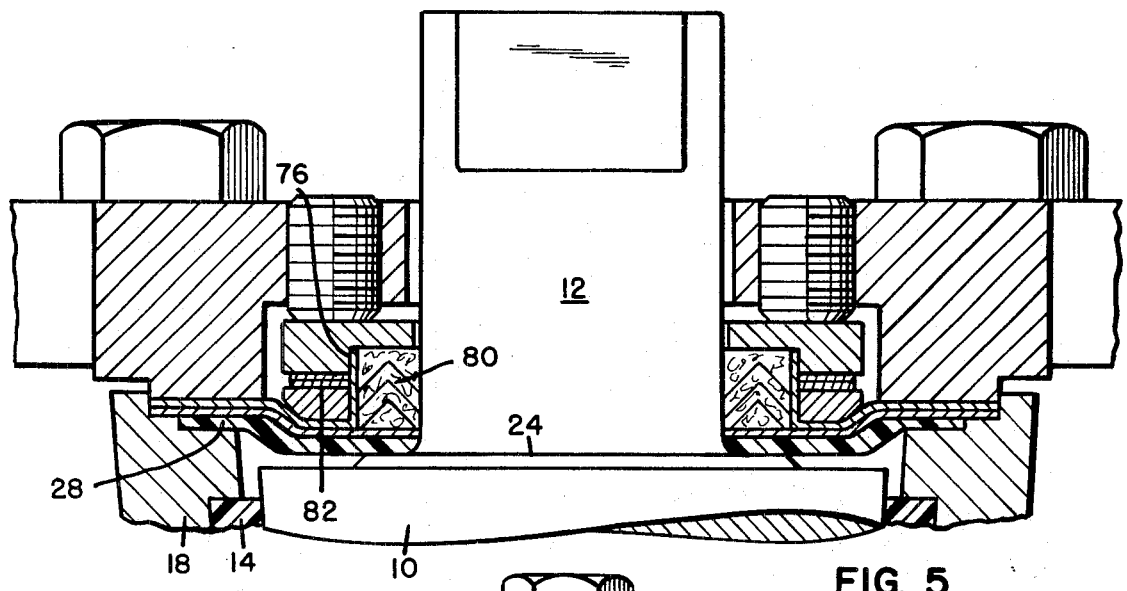
FIG. 5 is a view similar to FIG. 4, showing a modification thereof.

The modification illustrated by FIG. 5 is similar to the construction depicted by FIG. 4, except for two substitutions of elements. In FIG. 5, the chevron shaped packing rings 80 are substituted for the cluster of triangular sectioned rings 32 of FIG. 4; and where FIG. 4 employs a resilient, rubber like spacer ring 78, FIG. 5 employs a metallic wave spring 82 of ring shape. The wave spring 82, like the resilient ring 78, keeps a sustained yielding pressure on the diaphragms and plug shoulder 24.

In FIG. 5 as well as in FIG. 4, the pressure seal rings 80 and 32, and sealing elements 28 and 14, may be formed of Teflon or similar plastic material; however, if the valves are to withstand flame or high temperatures, the seal rings 80 and 32 are to be formed of fibrous asbestos or similar fireproof material, to effect the shank seal in the event of volatilization of sealing elements 14 and 28.

Figure 6:
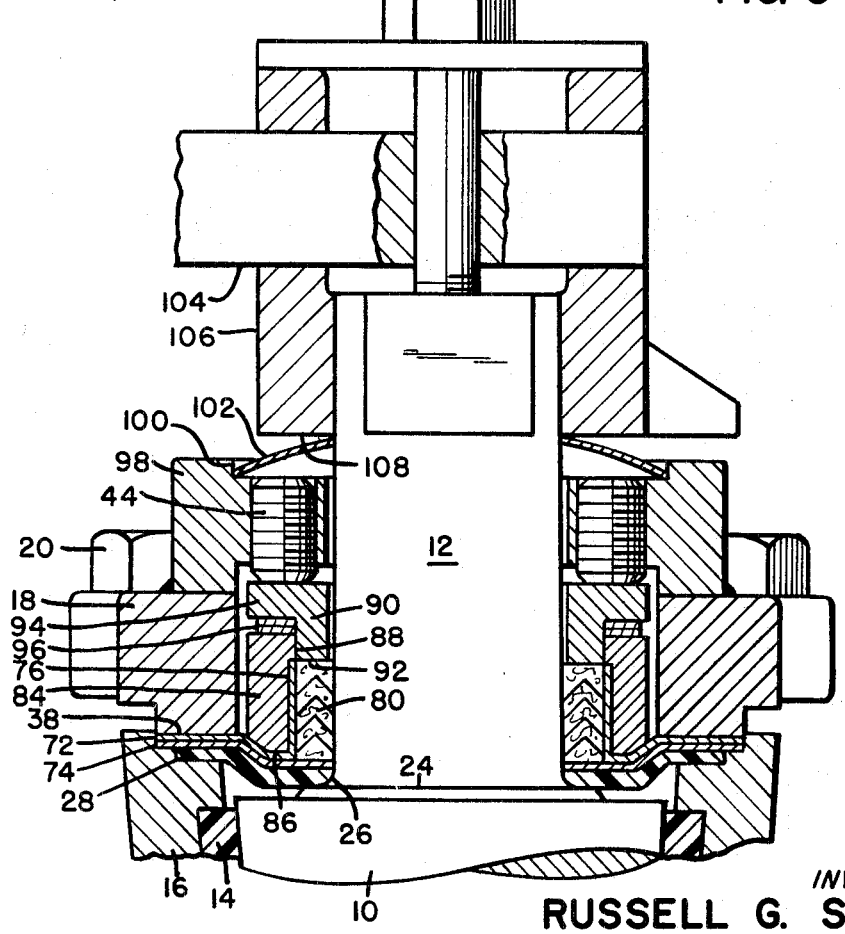
FIG. 6 is a fragmental vertical cross section of a different type of valve embodying the improved sealing means.

The FIG. 6 modification employs the three diaphragms 72, 74, and 28 of FIG. 4, clamped between the body 16 and cover plate 18 at 38. The metallic diaphragm 72 has its inner marginal portion turned upwardly as a collar 76, for confining a stack of chevron packing rings 80 which bear against the plug stem. The stack of rings stands upon diaphragm 74 and may be formed of Teflon, or of asbestos or their equivalents as in FIGS. 4 and 5.

Surrounding the collar 76 is a thrust ring 84 having a lower end 86 to press upon metallic diaphragm 72, while a shoulder 88 thereof presses upon the upper end of the collar. An upper thrust ring 90 of metal has an annular inner end portion 92, which rests upon and compresses the stack of packing rings 80 as the adjusting screws 44 are tightened down. A flange or outer portion 94 of ring 90 overlies the lower thrust ring 84, and exerts force on the latter through the agency of a resilient wave spring 96 or equivalent resilient spacer member.

From the foregoing, it will be understood that tightening the adjusting screws 44 advances ring 90 onto the packing 80 for compressing and spreading same into sealing contact against the collar 76 and plug stem 12. At the same time, force is applied through resilient member 96 to lower thrust ring 84, which stands upon metallic diaphragm 72 and surrounds the collar 76. The non metallic diaphragm 28 seals against plug shoulder 24 and fillet 26, as usual.

The cover plate neck 98 carries the adjusting screws 44, and may be provided with an upper circular recess 100 which is concentric with the plug stem or shank. Recess 100 supports the peripheral edge of a dome-shaped washer 102 which surrounds the plug stem and excludes dirt, moisture, and foreign matter in general, from the seals. Washer 102 may be omitted from the valve assembly, if desired.

Upon the upper portion of stem 12 is fixed an actuating member or handle 104 to be manipulated for rotating the plug stem. The handle carries a sleeve 106 having an annular lower face 108 which overlies the washer 102.

In FIG. 6, fluid leaking upwardly past the plug and sleeve 14, will seek to escape between the shoulder 24 and diaphragm 28 at fillet 26. Such fluid may possibly pass the overlying metallic diaphragm and reach the lower portion of the chamber housing the packing rings 80, but the sealing force applied to the packing by ring 90 so spreads the packing against collar 76 and stem 12, as to effectively preclude escape at these areas. Escaping fluid will tend to travel outwardly between the metallic diaphragms 72 and 74, but the force with which the diaphragms are clamped at 38 by the action of screws 20, effectively foils the escape here. As in the previously described structures, the packing rings 80 may be formed of asbestos or similar fireproof material, while the diaphragm 28 and sleeve 14 are of Teflon or equivalent plastic material. If fireproofing of the valve is considered unnecessary, the chevron packings 80 may be of any acceptable sealing material, including Teflon or equivalent plastic substance. Teflon may be described as a polytetrafluoroethylene material.

As used herein reference to diaphragm of non metallic material, impervious to fluids and gas broadly refers to and comprehends fluorocarbons generally and in particular those designated as FEP viz fluorinated-ethylene-propylene and TFE viz polytetrafluoroethylene.

I claim:

1. A valve comprising a rotatable valving member including a rotatable stem having a free end and an annular shoulder; a valve body having a chamber including a seat engaged by the valving member, and a circumferential clamping face encircling said chamber; a cover member having a central aperture loosely accommodating the stem, and including a clamping face complementary to the clamping face of the body; a sealing diaphragm of nonmetallic material, impervious to fluids and gas having an outer rim to overlie the clamping face of the body, and an apertured central portion receptive of the stem and sealing against the annular shoulder thereof; a deformable stem-embracing pressure seal ring overlying said shoulder and the abutting portion of the sealing diaphragm, said seal ring having an outer annular surface; a rigid thrust ring surrounding the stem and overlying the seal ring, and means for advancing the thrust ring toward said seal ring; a stiff metallic diaphragm having a rim disposed between the clamping faces aforesaid, and an apertured central portion surrounding the stem, said apertured portion having a marginal area turned toward the stem end and away from the stem shoulder and into abutment with both the rigid thrust ring and the aforesaid outer annular surface of the stem-embracing pressure seal ring; and means clamping the rims of both diaphragms between the clamping faces of the body and the cover member.

2. The valve as specified by claim 1, wherein is included a second stiff metallic diaphragm interposed between the two diaphragms aforesaid, said second metallic diaphragm having a rim, and an apertured central portion surrounding the stem, said apertured central portion of the second metallic diaphragm being interposed between said deformable stem-embracing pressure seal ring and the portion of said nonmetallic sealing diaphragm which seals against the stem shoulder; the rim of said second metallic diaphragm being clamped by means last mentioned.

3. The valve as specified by claim 1, wherein the pressure seal ring comprises three sealing surfaces, one overlying the stem-adjacent portion of the sealing diaphragm, the second overlying the stem, the third underlying the apertured stem adjacent central portion of the metallic diaphragm.

4. The valve as specified by claim 2, wherein the pressure seal ring comprises three sealing surfaces, one of which overlies the apertured stem-adjacent portion of the second metallic diaphragm, the second of which overlies the stem and the third of which underlies the apertured stem-adjacent central portion of the first mentioned metallic diaphragm.

5. The valve as specified by claim 1, wherein the aforesaid seat engaged by the valving member is a sleeve of deformable material subject to volatilization by heat, and said non metallic sealing diaphragm likewise is subject to volatilization by heat; and wherein said stem-embracing pressure seal ring is indestructible by the amount of heat which produces volatilization of said sleeve and said non metallic sealing diaphragm.

6. The valve as specified by claim 2, wherein the aforesaid seat engaged by the valving member is a sleeve of deformable material subject to volatilization by heat, and said nonmetallic sealing diaphragm likewise is subject to volatilization by heat; and wherein said stem-embracing pressure seal ring is indestructible by the amount of heat which produces volatilization of said sleeve and said nonmetallic sealing diaphragm.

7. The valve as specified by claim 1, wherein the outer annular surface of the deformable pressure seal ring is angularly inclined relative to the axis of the valving member stem, and a substantially similar inclination characterizes the abutting aforesaid turned marginal area of the metallic diaphragm.

8. The valve as specified by claim 2, wherein the outer annular surface of the deformable pressure seal ring is angularly inclined relative to the axis of the valving member stem, and a substantially similar inclination characterizes the abutting aforesaid turned marginal area of the metallic diaphragm.

9. The valve as specified by claim 7, wherein the aforesaid seat engaged by the valving member is a sleeve of deformable material subject to volatilization by heat, and said nonmetallic sealing diaphragm likewise is subject to volatilization by heat; and wherein said stem-embracing pressure seal ring is indestructible by the amount of heat which produces volatilization of said sleeve and said nonmetallic sealing diaphragm.

10. The valve as specified by claim 6, wherein the outer annular surface of the deformable pressure seal ring is angularly inclined relative to the axis of the valving member stem, and a substantially similar inclination characterizes the aforesaid turned marginal area of the metallic diaphragm.

11. A valve comprising a rotatable valving member including a rotatable stem having a free end and an annular shoulder; a valve body having a chamber including a seat engaged by the valving member, and a circumferential clamping face encircling said chamber; a cover member having a central aperture loosely accommodating the stem, and including a clamping face; a sealing diaphragm of nonmetallic material impervious to fluids and gas, having an outer rim to overlie the clamping face of the body, and an apertured central portion receptive of the stem and sealing against the shoulder thereof; a deformable stem-embracing stack of pressure seal rings overlying said shoulder and the abutting portion of the sealing diaphragm, said seal ring stack having an outer annular surface; a rigid first thrust ring surrounding said seal ring stack and overlying the sealing diaphragm; a first stiff metallic diaphragm and a second stiff metallic diaphragm, each having a rim disposed between the clamping faces aforesaid; said second metallic diaphragm having an apertured central portion surrounding the stem and being interposed between said deformable pressure seal ring stack and that portion of said nonmetallic diaphragm that seals against the stem shoulder, said second metallic diaphragm being in flatwise abutment against said nonmetallic diaphragm; said first metallic diaphragm having an apertured central portion turned as a collar in the direction of the free end of the stem, said collar surrounding and confining the stack of seal rings, and said first metallic diaphragm to the exclusion of said collar being in flatwise abutment with said second metallic diaphragm; a second rigid thrust ring having an outer portion overlying the first thrust ring, and an inner portion overlying and contacting the stack of pressure seal rings; means for holding the second rigid thrust ring projected toward said stack and said first thrust ring; yielding means between the first thrust ring and the overlying portion of the second thrust ring, for transmitting force between said thrust rings; and means for securing the diaphragm rims between the clamping faces of the valve body and the cover member.

12. The valve as specified by claim 11 wherein the deformable stack of pressure seal rings includes rings which are chevron-shaped in cross section.

13. The valve as specified by claim 11 wherein the deformable stack of pressure rings includes rings which are triangular in cross section.

14. The valve as specified by claim 11, wherein the aforesaid seat engaged by the valving member is a sleeve of deformable material subject to volatilization by heat, and said nonmetallic sealing diaphragm likewise is subject to volatilization by heat; and wherein said stem-embracing pressure seal rings are of a material indestructible by the amount of heat which produces volatilization of said sleeve and said nonmetallic sealing diaphragm.

15. A valve as specified by claim 1 wherein the sealing diaphragm and pressure seal ring are fabricated from a fluorocarbon material characterized by its inertness to corrosion and its low coefficient of friction.